(12) United States Patent
Noh et al.

(10) Patent No.: US 9,079,992 B2
(45) Date of Patent: Jul. 14, 2015

(54) OLEFIN BLOCK COPOLYMER AND PREPARATION METHOD THEREOF

(75) Inventors: Kyung-Seop Noh, Daejeon (KR); Nan-Young Lee, Seoul (KR); Won-Hee Kim, Daejeon (KR); Sang-Eun An, Daejeon (KR); Sang-Jin Jeon, Daejeon (KR); Cheon-Il Park, Daejeon (KR); Choong-Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/980,860

(22) PCT Filed: Jan. 19, 2012

(86) PCT No.: PCT/KR2012/000492
§ 371 (c)(1),
(2), (4) Date: Sep. 16, 2013

(87) PCT Pub. No.: WO2012/099414
PCT Pub. Date: Jul. 26, 2012

(65) Prior Publication Data
US 2014/0011974 A1    Jan. 9, 2014

(30) Foreign Application Priority Data

| | | | |
|---|---|---|---|
| Jan. 21, 2011 | (KR) | ........................ | 10-2011-0006278 |
| Jan. 21, 2011 | (KR) | ........................ | 10-2011-0006396 |
| Jan. 21, 2011 | (KR) | ........................ | 10-2011-0006437 |
| Jan. 18, 2012 | (KR) | ........................ | 10-2012-0005864 |

(51) Int. Cl.
| | |
|---|---|
| *C08F 210/16* | (2006.01) |
| *C08F 4/6592* | (2006.01) |
| *C08F 4/653* | (2006.01) |
| *C08L 23/08* | (2006.01) |
| *C08L 23/14* | (2006.01) |
| *C08F 297/08* | (2006.01) |

(52) U.S. Cl.
CPC ............ *C08F 210/16* (2013.01); *C08F 297/08* (2013.01); *C08L 23/0815* (2013.01); *C08L 23/14* (2013.01); *C08L 23/142* (2013.01); *C08F 4/6592* (2013.01)

(58) Field of Classification Search
CPC .. C08F 210/02; C08F 210/16; C08F 4/65904; C08F 4/65908; C08F 4/65016; C08F 4/6592; C08L 23/0815; C08L 23/14; C08L 23/142
USPC ......... 526/113, 114, 133, 160, 161, 348, 943; 525/240
See application file for complete search history.

(56) References Cited

U.S. PATENT DOCUMENTS

2009/0324914 A1* 12/2009 Liang et al. ................... 428/219
2011/0003524 A1   1/2011 Claasen et al.

FOREIGN PATENT DOCUMENTS

| | | |
|---|---|---|
| CN | 101405311 A | 4/2009 |
| KR | 10-2009-0086419 | 8/2009 |
| KR | 10-2010-0037707 | 4/2010 |
| KR | 10-2010-0041818 | 4/2010 |
| KR | 1020100037707 A | 4/2010 |
| KR | 10-2010-0104564 | 9/2010 |
| KR | 10-2010-0114370 | 10/2010 |
| KR | 10-2011-0118250 | 10/2011 |
| KR | 10-2011-0118252 | 10/2011 |
| KR | 10-2011-0118596 | 10/2011 |
| WO | 2009097560 A1 | 8/2009 |
| WO | 2009097565 A1 | 8/2009 |

* cited by examiner

*Primary Examiner* — Caixia Lu
(74) *Attorney, Agent, or Firm* — McKenna Long & Aldridge LLP

(57) ABSTRACT

The present description relates to an olefin block copolymer having excellences in elasticity and heat resistance and its preparation method. The olefin block copolymer includes a plurality of blocks or segments, each of which includes an ethylene or propylene repeating unit and an α-olefin repeating unit at different weight fractions. The olefin block copolymer has a density of 0.85 to 0.92 g/cm$^3$, and density X (g/cm$^3$) and TMA (Thermal Mechanical Analysis) value Y (° C.) satisfy a defined relationship.

10 Claims, 1 Drawing Sheet

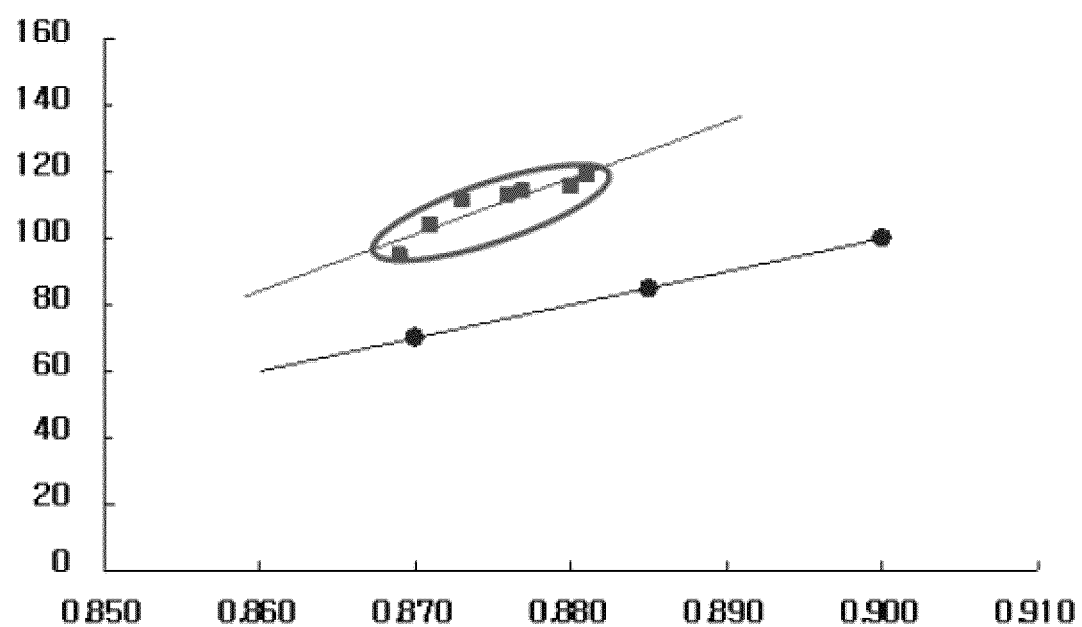

OLEFIN BLOCK COPOLYMER AND PREPARATION METHOD THEREOF

This application is a National Stage entry of International Application No. PCT/KR2012/000492, filed on Jan.19, 2012, which claims priority to Korean Patent Application Nos. 10-2011-0006278, 10-2011-0006396, 10-2011-0006437, all filed on Jan.21, 2011 and 10-2012-0005864, filed on Jan.18, 2012, with the Korean Patent Office, all of which are incorporated herein in their entirety by reference.

TECHNICAL FIELD

The present invention relates to an olefin block copolymer and its preparation method.

BACKGROUND

A block copolymer refers to a copolymer consisting of a plurality of blocks or segments of repeating units distinct in characteristics from one another. It tends to be superior in characteristics to typical random copolymers or polymer blends. For example, the block copolymer may include both of soft elastic blocks (referred to as "soft segments") and hard crystalline blocks (referred to as "hard segments,") and thus have good properties, such as excellent elasticity and heat resistance. More specifically, such a block copolymer has elasticity at a temperature equal to or higher than the glass transition temperature of the soft segments and shows a thermoplastic behavior at a temperature higher than the melting temperature, so it can have relatively good heat resistance.

A specific example of the block copolymer, SBS (styrene-butadiene-styrene) triblock copolymers and their hydrogenated versions (e.g., SEBS) are known for their usefulness in a variety of applications since they have good characteristics regarding heat resistance and elasticity.

Recently, the use of olefin-based elastomers, which are a copolymer of ethylene/propylene and α-olefin, has been intensively under consideration. More specifically, many attempts have been made to use the olefin-based elastomers in a variety of applications, such as for use purposes as a substitute for rubber materials. For further improvement on the heat resistance of the olefin-based elastomers, there has been an attempt to use block copolymer type elastomers in place of the conventional random copolymer type olefin-based elastomers such as ethylene-α-olefin random copolymers.

In spite of those attempts, however, the study for commercialization of olefin-based elastomers with enhanced heat resistance has already reached its limit. Accordingly, there have been consistent demands for olefin-based elastomers that can be prepared at production cost low enough to achieve commercialization and have enhanced heat resistance.

SUMMARY

The present invention provides a preparation method for an olefin block copolymer with good elasticity and enhanced heat resistance.

In accordance with an embodiment of the present description, there is provided an olefin block copolymer comprising a plurality of blocks or segments, each comprising an ethylene or propylene repeating unit and an α-olefin repeating unit at different weight fractions, where the olefin block copolymer has a density of 0.85 to 0.92 g/cm$^3$, and density X (g/cm$^3$) and TMA (Thermal Mechanical Analysis) value Y (° C.) satisfy the following Mathematical Formula 1:

$$Y \geq 1378.8X - 1115 \quad \text{[Mathematical Formula 1]}$$

In the embodiment of the olefin block copolymer, the density X (g/cm$^3$) and the TMA (Thermal Mechanical Analysis) value Y (° C.) may satisfy the following Mathematical Formula 1a:

$$1378.8X - 1076.3 \geq Y \geq 1378.8X - 1115 \quad \text{[Mathematical Formula 1a]}$$

Further, the olefin block copolymer may have the TMA value in the range of about 70 to 140° C.

The olefin block copolymer of the embodiment may comprise a hard segment comprising a first weight fraction of the α-olefin repeating unit and a soft segment comprising a second weight fraction of the α-olefin repeating unit, where the second weight fraction is greater than the first weight fraction. Further, the weight fraction of the α-olefin repeating unit contained in the entire block copolymer may have a value between the first and second weight fractions.

Further, the olefin block copolymer of the embodiment may comprise about 10 to 90 wt. % of the hard segment and a remaining content of the soft segment.

In the olefin block copolymer of the embodiment, the hard segment may have a higher value than the soft segment in at least one property of the degree of crystallization, density, and melting temperature.

The olefin block copolymer of the embodiment may comprise about 30 to 90 wt. % of the ethylene or propylene repeating unit and a remaining content of the α-olefin repeating unit.

The olefin block copolymer of the embodiment may have a melt index of about 0.5 to 5 g/10 min under a load of 2.16 kg at 190° C. and a Shore hardness of about 50 to 100. Further, the olefin block copolymer may have a permanent recovery (after 300% elongation) of about 100% or less, and a melting temperature of about 100 to 140° C.

Further, the olefin block copolymer of the embodiment may have a weight average molecular weight of about 50,000 to 200,000 and a molecular weight distribution of about 2.0 to 4.5.

In accordance with another embodiment of the present invention, there is provided a method for preparing an olefin block copolymer, the method comprising:

copolymerizing monomers comprising ethylene or propylene and α-olefin under conditions including a temperature of about 140° C. or higher and a pressure of about 50 bar of higher, in the presence of a catalyst composition for olefin polymerization comprising a transition metal compound having a structure that a compound represented by the following Chemical Formula 1 as a ligand forms a coordinate covalent bond to a Group IV transition metal, and a compound represented by the following Chemical Formula 2:

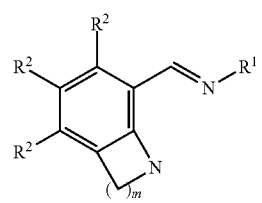

[Chemical Formula 1]

In the Chemical Formula 1, m is an integer from 1 to 7;

R$^1$ is a C$_4$-C$_{10}$ cycloalkyl group having at least one substituent selected from the group consisting of hydrogen, deuterium, halogen, nitrile, acetylene, amine, amide, ester, ketone, C$_1$-C$_{20}$ alkyl, C$_6$-C$_{20}$ cycloalkyl, C$_2$-C$_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; a $C_3$-$C_9$ heterocyclic group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom; a $C_6$-$C_{10}$ aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; or a $C_5$-$C_{10}$ hetero-aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom, wherein when $R^1$ has at least two substituents, the adjacent two groups forms an aliphatic or aromatic condensed ring; and $R^2$s are the same or different from one another and independently selected from hydrogen, deuterium, halogen, nitrile, acetylene, amine, amide, ester, ketone, $C_1$-$C_{20}$ alkyl, $C_2$-$C_{20}$ alkenyl, $C_6$-$C_{20}$ aryl, $C_4$-$C_{20}$ heterocyclic, $C_1$-$C_{20}$ alkoxy, and $C_6$-$C_{20}$ aryloxy, wherein at least two $R^2$ are linked to each other to form an aliphatic or aromatic ring,

[Chemical Formula 2]

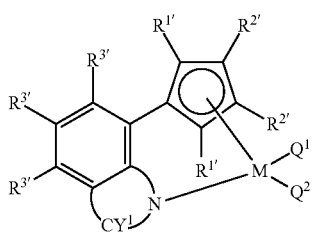

In the Chemical Formula 2, $R^{1'}$ is $R^{2'}$ are independently hydrogen, $C_1$-$C_{20}$ alkyl, $C_6$-$C_{20}$ aryl, silyl, $C_2$-$C_{20}$ alkenyl, $C_7$-$C_{20}$ alkylaryl, $C_7$-$C_{20}$ arylalkyl, or Group 14 metalloid radical having a hydrocarbyl substituent, wherein $R^{1'}$ and $R^{2'}$ are linked to each other via an alkylidyne radical containing a $C_1$-$C_{20}$ alkyl group or an aryl group to form a ring;

$R^{3'}$s are independently hydrogen, halogen, $C_1$-$C_{20}$ alkyl, $C_6$-$C_{20}$ aryl, $C_1$-$C_{20}$ alkoxy, $C_6$-$C_{20}$ aryloxy, or amido, wherein at least two $R^{3'}$s are linked to each other to form an aliphatic or aromatic ring;

$CY^1$ is a substituted or unsubstituted aliphatic or aromatic ring;

M is a Group IV transition metal; and $Q^1$ and $Q^2$ are independently halogen, $C_1$-$C_{20}$ alkyl, $C_6$-$C_{20}$ arylamido, $C_2$-$C_{20}$ alkenyl, $C_6$-$C_{20}$ aryl, $C_7$-$C_{20}$ alkylaryl, $C_7$-$C_{20}$ arylalkyl, or $C_1$-$C_{20}$ alkylidene.

In the preparation method of the another embodiment, the catalyst composition may further comprise at least one polymerization aid selected from the group consisting of an aluminum compound containing a $C_1$-$C_{12}$ hydrocarbyl substituent, a zinc compound containing a $C_1$-$C_{12}$ hydrocarbyl substituent, and a gallium compound containing a $C_1$-$C_{12}$ hydrocarbyl substituent. The catalyst composition may further comprise a defined cocatalyst compound.

In the preparation method of the another embodiment, the α-olefin repeating unit may be a repeating unit derived from at least one α-olefin selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

BRIEF DESCRIPTION OF THE DRAWINGS

FIG. 1 shows a linear regression graph showing the relationship between the density X and the TMA value Y of the olefin block copolymers of Examples 1 to 7 in comparison with the copolymers of Comparative Examples 1, 2 and 3.

DETAILED DESCRIPTION OF THE EMBODIMENTS

Hereinafter, a detailed description will be given as to the olefin block copolymer according to the embodiments of the present description and the production method thereof. However, these embodiments are provided as a mere illustration and not intended to limit the scope of the invention. Moreover, it is apparent to those skilled in the art that the embodiments may be modified in many ways.

Unless stated otherwise, some terms as used in the entire specification may be defined as follows.

The term "(olefin) block copolymer" as used herein refers to a copolymer of ethylene or propylene and α-olefin, where the copolymer comprises a plurality of blocks or segments of repeating units that are distinguishable from one another in terms of at least one property of, for example, the content (weight fraction) of the repeating unit derived from ethylene (or propylene), the content (weight fraction) of the repeating unit from α-olefin, the degree of crystallization, density, or melting temperature.

A plurality of such blocks or segments may comprise, for example, an ethylene or propylene repeating unit and an α-olefin repeating unit, on the condition that the contents (weight fractions) of the repeating units are different from each other. For example, a plurality of the blocks or the segments may comprise a hard segment which is a hard crystalline block comprising a first weight fraction of the α-olefin, and a soft segment which is a soft elastic block comprising a second weight fraction of the α-olefin, where the second weight fraction is greater than the first weight fraction. In this regard, the first weight fraction may be lower than the weight fraction of the α-olefin repeating unit as measured for the entire block copolymer, while the second weight fraction may be higher than the weight fraction of the α-olefin repeating unit for the entire block copolymer.

In addition, a plurality of the blocks or segments may be distinguishable from one another in terms of at least one property selected from the degree of crystallization, density, and melting point. In comparison with the soft segment which is a soft elastic block, for example, the hard segment which is a hard crystalline block may have a higher value in terms of at least one or two properties of the degree of crystallization, density, and melting temperature.

On the other hand, the olefin block copolymer according to one embodiment of the present invention may be defined by the after-mentioned relationship between density and TMA (Thermal Mechanical Analysis) values in addition to the properties, such as the weight fractions of the ethylene or propylene repeating unit and the α-olefin repeating unit constituting the olefin block copolymer, the degree of crystallization of each block or segment, density, or melting temperature.

Such an olefin block copolymer of the embodiment may comprise a plurality of blocks or segments, each of which comprises an ethylene or propylene repeating unit and an α-olefin repeating unit at different weight fractions, and have a density of 0.85 to 0.92 g/cm³, where density X (g/cm³) and TMA (Thermal Mechanical Analysis) value Y (° C.) satisfy the following Mathematical Formula 1:

$$Y \geq 1378.8X - 1115 \quad \text{[Mathematical Formula 1]}$$

The olefin block copolymer of the embodiment, which contains repeating units derived from ethylene or propylene and α-olefin by copolymerization, may benefit from the inclusion of the α-olefin repeating unit derived from α-olefin to have good elasticity.

As the olefin block copolymer is prepared using the after-mentioned specific catalyst system, it has a higher TMA value of about 70 to 140° C., about 80 to 130° C., or about 90 to 120° C. than the conventional olefin copolymers (e.g., ethylene-α-olefin random copolymers), when prepared to have a defined level of density. Further, the density X (g/cm³) and the TMA (Thermal Mechanical Analysis) value Y (° C.) satisfy the Mathematical Formula 1. This means that the olefin copolymer of the embodiment can have a considerably high level of TMA value at the same density in comparison with the ethylene-α-olefin random copolymers used as conventional olefin-based elastomers, which implies good heat resistance of the olefin block copolymer of the embodiment. More specifically, the olefin block copolymer may have the density X (g/cm³) and the TMA (Thermal Mechanical Analysis) value Y (° C.) satisfy the following Mathematical Formula 1a:

$$1378.8X - 1076.3 \geq Y \geq 1378.8X - 1115 \quad \text{[Mathematical Formula 1a]}$$

Such a good heat resistance presumably results from the fact that the block copolymer of the embodiment has a blocked form.

Because the block copolymer is prepared in the presence of the after-mentioned specific catalyst system, it may have a blocked form having a plurality of blocks or segments distinct in physical or chemical properties from one another. More specifically, such a block copolymer may include a plurality of blocks or segments of an ethylene or propylene repeating unit and an α-olefin repeating unit at different weight fractions. For example, the block copolymer may have a blocked form comprising hard segments which are hard crystalline blocks comprising a first weight fraction of the α-olefin repeating unit, and soft segments which are soft elastic blocks comprising a second weight fraction of the α-olefin repeating unit. In this regard, the weight fraction of the α-olefin repeating unit included in the entire block copolymer has a value between the first and second weight fractions. In other words, the first weight fraction can be lower than the weight fraction of the α-olefin repeating unit calculated for the entire block copolymer, while the second weight fraction is higher than the weight fraction of the α-olefin repeating unit calculated for the entire block copolymer.

In this manner, the olefin block copolymer of the embodiment has such a blocked form comprising a plurality of blocks or segments. In particular, as the block copolymer includes hard segments of the hard crystalline blocks with higher weight fraction of the ethylene or propylene repeating unit, it has higher values of TMA (Thermal Mechanical Analysis) than the conventional olefin-based elastomers at the same density level. In addition, the block copolymer of the embodiment may have a high melting temperature Tm of about 100 to 140° C., about 110 to 130° C., or about 120 to 130° C. Thus, the block copolymer of the embodiment shows excellent properties such as good elasticity as an elastomer even at higher temperature, consequently with enhanced heat resistance.

Accordingly, the olefin block copolymer of the embodiment can exhibit enhanced heat resistance as well as good elasticity pertaining to copolymerization of α-olefin, making it possible to provide olefin-based elastomers with good elasticity and heat resistance. Therefore, such an olefin block copolymer can be used as a substitute for rubber materials to overcome the limit of the conventional olefin-based elastomers in regards to the range of applications and enable commercialization of the olefin-based elastomers useful in a wider range of fields.

In the aforementioned olefin block copolymer of the embodiment, the density can be measured with a mettler density scale according to a known method. Further, the TMA value can be measured with a known thermomechanical analyzer, such as, for example, TMA Q400 manufactured by TA Instruments. The specific TMA measurement method and conditions are apparent to those skilled in the art and described in the after-mentioned examples. Once the density and TMA values of the block copolymer according to the methods, the resultant data are used to acquire a relational formula through linear regression analysis and to determine whether the copolymer satisfies the Mathematical Formula 1 (Refer to FIG. 1).

On the other hand, a plurality of blocks or segments contained in the block copolymer of the embodiment, such as, for example, hard segments and soft segments are distinguishable from one another by at least one of the properties of the degree of crystallization, density, or melting temperature. For example, the hard segment which is the hard crystalline block comprising an ethylene or propylene repeating unit at higher weight fraction may have a higher value in at least one property of the degree of crystallization, density, melting point, and the like, in comparison with the soft segment which is the soft elastic block comprising an α-olefin repeating unit at higher weight fraction. This presumably results from the higher crystallinity of the hard segments. Such blocks or segments can be characterized and/or classified by preparing a (co)polymer corresponding to each block or segment and measuring its properties.

For the olefin block copolymer of the embodiment, the melt index under a load of 2.16 kg at 190° C. is about 0.5 to 5 g/10 min, about 0.5 to 4.5 g/10 min, about 0.7 to 4.0 g/10 min, or about 0.7 to 3.7 g/10 min, and the Shore hardness is about 50 to 100, about 60 to 90, or about 60 to 85. As the block copolymer has such levels of melt index and Shore hardness, it exhibits good mechanical properties and high processability and thus can be used as a substitute for rubber materials in a variety of applications.

In addition, the olefin block copolymer of the embodiment may have a permanent recovery in the range of about 100% or less, about 10 to 80%, about 15 to 70%, or about 20 to 60%. In this regard, the permanent recovery can be determined from the results of a tensile test performed on a molded body of the block copolymer according to the following Mathematical Formula 2:

$$\text{Permanent recovery}(\%) = \{(L-L_0)/L_0\} \times 100 \quad \text{[Mathematical Formula 2]}$$

In the Mathematical Formula 2, $L_0$ denotes the initial length of the molded body of the block copolymer; and L denotes the length of the molded body recovered from at least 300% deformation, for example, 300% elongation.

The permanent recovery is defined as the degree of recovery to the original form or length from deformation imposed by an external force. When the permanent recovery after 300% elongation is about 100% or less, the block copolymer of the embodiment is considered to have good elasticity. Particularly, the block copolymer of the embodiment has excellent elasticity even at high temperature as already described above, so it can be much preferably used in a wider range of applications, including those requiring heat resistance.

The block copolymer of the embodiment may comprise the ethylene or propylene repeating unit at a content of about 30 to 90 wt. %, about 50 to 85 wt. %, or about 60 to 90 wt. %. Also, the block copolymer may comprise the above-defined content of the ethylene or propylene repeating unit and a remaining content (i.e., about 10 to 70 wt. %, about 15 to 50 wt. %, or about 10 to 40 wt. %) of the α-olefin repeating unit. As the block copolymer comprises such a content of the α-olefin repeating unit, it can have good elasticity as an elastomer and hence contain the ethylene or propylene repeating unit at an optimized content range to secure good heat resistance.

Further, the block copolymer of the embodiment may comprise about 10 to 90 wt. %, about 20 to 85 wt. %, or about 25 to 80 wt. % of the hard segment and a remaining content (i.e., about 10 to 90 wt. %, about 15 to 80 wt. %, or about 20 to 75 wt. %) of the soft segment.

In this regard, the weight fraction of the hard segment can be calculated with a time domain NMR (TD NMR) instrument commercially available. More specifically, the TD NMR instrument is used to determine the free induction decay (FID) for a sample of the block copolymer, where the FID is expressed as a function of time and intensity. In the following Mathematical Formulas 3, four constants, A, B, T2$_{fast}$, and T2$_{slow}$ are varied to elicit a functional formula most approximating the graph of the above-mentioned FID function and thereby to determine the constant values for the sample, such as A, B, T2$_{fast}$, and T2$_{slow}$. For reference, the T2 (spin-spin relaxation time) relaxation for the hard segment as calculated from the functional formula appears fast, while the T2 relaxation for the soft segment is slow. Among the calculated values of A, B, T2$_{fast}$, and T2$_{slow}$, the lower T2 value is determined as the T2 value of the hard segment, that is, T2$_{fast}$, while the higher T2 value is determined as the T2 value of the soft segment, that is, T2$_{slow}$. This process enables it to calculate the content (wt. %) of the hard segment as well as the constants of A and B.

Intensity=$A \times$EXP($-$Time/$T2_{fast}$)+
$B \times$EXP($-$Time/$T2_{slow}$)  [Mathematical Formulas 3]

Determine A, B, T2$_{fast}$, and T2$_{slow}$ by fitting.

Hard segment(wt. %)=$A/(A+B) \times 100$

In the Mathematical Formulas 3, intensity and time are values calculated through the FID analysis; T2$_{fast}$ is the T2 (spin-spin relaxation time) relaxation value for the hard segment; and T2$_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

As described above, among a plurality of blocks or segments constituting the block copolymer, the hard segment means a hard crystalline segment having a higher content of the ethylene or propylene repeating unit and contributes to the excellent heat resistance of the block copolymer. The soft segment which is included at a remaining content in the block copolymer means a soft elastic segment having a higher content of the α-olefin repeating unit and contributes to the elasticity of the block copolymer. As the block copolymer of the embodiment comprises the hard and soft segments in the defined content range, it can exhibit excellent heat resistance and adequate elasticity as an elastomer.

The block copolymer may have a weight average molecular weight of about 50,000 to 200,000, about 60,000 to 180,000, or about 70,000 to 150,000, and a molecular weight distribution of about 2.0 or greater (e.g., about 2.0 to 4.5, about 2.0 to 4.0, about 2.0 to 3.5, or about 2.3 to 3.0). Further, the block copolymer of the embodiment may have a density of about 0.85 to 0.92 g/cm$^3$, 0.86 to 0.90 g/cm$^3$, or 0.86 to 0.89 g/cm$^3$. As the block copolymer has such levels of molecular weight, molecular weight distribution, and density, it can show appropriate properties as an olefin-based elastomer, such as, for example, good mechanical properties and high processability.

The block copolymer may be a block copolymer comprising an ethylene or propylene repeating unit (for example, an ethylene repeating unit) and an α-olefin repeating unit. In this regard, the α-olefin repeating unit may be a repeating unit derived from α-olefins, such as 1-butene, 1-pentene, 4-methyl-1-pentene, 1-hexene, 1-heptene, 1-octene, 1-decene, 1-undecene, 1-dodecene, 1-tetradecene, 1-hexadecene, or 1-itocene.

The olefin block copolymer of the embodiment benefits from the inclusion of the α-olefin repeating unit derived from α-olefin to have good elasticity and has good heat resistance pertaining to a high degree of blocking. Therefore, the block copolymer of the embodiment can be used in a wider range of applications requiring heat resistance, overcoming the limitation of olefin-based elastomers in regards to the range of applications.

The block copolymer of the embodiment may be used substantially in all the applications in which the conventional elastomers have been adopted. Moreover, the block copolymer of the embodiment can be used in a wider range of applications to which the conventional olefin-based elastomers are substantially not applicable because of their poor heat resistance. For example, the block copolymer of the embodiment is used to form different kinds of products, including automobile parts or interior materials, such as bumpers, trimming parts, etc.; packaging materials; insulating materials; household products, such as shoe soles, toothbrush grips, flooring materials, knobs, etc.; adhesives, such as pressure-sensitive adhesives, hot melting adhesives, etc.; hoses; pipes; and so forth and adopted in a variety of other applications and uses.

The block copolymer of the embodiment may be used alone or in combination with other polymers, resins, or any kind of additives and used in any form of films, molded bodys, or fibers.

In accordance with another embodiment of the present invention, there is provided a method for preparing the olefin block copolymer. Such a preparation method for the olefin block copolymer according to the another embodiment may comprise copolymerizing monomers including an ethylene or propylene monomer and an α-olefin monomer under conditions of the temperature of 140° C. or higher and the pressure of 50 bar or higher, in the presence of a catalyst composition for olefin polymerization comprising a transition metal compound having a structure that a compound represented by the following Chemical Formula 1 as a ligand forms a coordinate covalent bond to a Group IV transition metal and a compound represented by the following Chemical Formula 2:

[Chemical Formula 1]

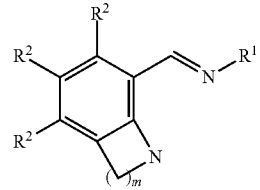

In the Chemical Formula 1, m is an integer from 1 to 7;
R$^1$ is a C$_4$-C$_{10}$ cycloalkyl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; a $C_3$-$C_9$ heterocyclic group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom; a $C_6$-$C_{10}$ aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; or a $C_5$-$C_{10}$ hetero-aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom, where when $R^1$ has at least two substituents, the adjacent two groups forms an aliphatic or aromatic condensed ring; and $R^2$s are the same or different from one another and independently selected from hydrogen, deuterium, halogen, nitrile, acetylene, amine, amide, ester, ketone, $C_1$-$C_{20}$ alkyl, $C_2$-$C_{20}$ alkenyl, $C_6$-$C_{20}$ aryl, $C_4$-$C_{20}$ heterocyclic, $C_1$-$C_{20}$ alkoxy, and $C_6$-$C_{20}$ aryloxy, where at least two $R^2$ are linked to each other to form an aliphatic or aromatic ring.

[Chemical Formula 2]

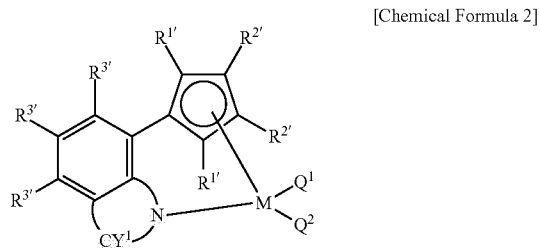

In the Chemical Formula 2, $R^1$ is $R^2$ are independently hydrogen, $C_1$-$C_{20}$ alkyl, $C_6$-$C_{20}$ aryl, silyl, $C_2$-$C_{20}$ alkenyl, $C_7$-$C_{20}$ alkylaryl, $C_7$-$C_{20}$ arylalkyl, or Group 14 metalloid radical having a hydrocarbyl substituent, where $R^{1'}$ and $R^{2'}$ are linked to each other via an alkylidyne radical containing a $C_1$-$C_{20}$ alkyl group or an aryl group to form a ring;

$R^3$'s are independently hydrogen, halogen, $C_1$-$C_{20}$ alkyl, $C_6$-$C_{20}$ aryl, $C_1$-$C_{20}$ alkoxy, $C_6$-$C_{20}$ aryloxy, or amido, where at least two $R^3$'s are linked to each other to form an aliphatic or aromatic ring;

$CY^1$ is a substituted or unsubstituted aliphatic or aromatic ring;

M is a Group IV transition metal; and $Q^1$ and $Q^2$ are independently halogen, $C_1$-$C_{20}$ alkyl, $C_6$-$C_{20}$ arylamido, $C_2$-$C_{20}$ alkenyl, $C_6$-$C_{20}$ aryl, $C_7$-$C_{20}$ alkylaryl, $C_7$-$C_{20}$ arylalkyl, or $C_1$-$C_{20}$ alkylidene.

Hereinafter, a further detailed description will be given as to the catalyst composition used in the another embodiment and a preparation method for the olefin block copolymer using the catalyst composition.

Among the substituents of the Chemical Formulas 1 and 2 in the preparation method of the another embodiment, the alkyl group includes a linear or branched alkyl group; the alkenyl group includes a linear or branched alkenyl; the silyl group includes trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, or the like; the aryl group includes a hetero-aryl group as well as a $C_6$-$C_{20}$ aryl group. Specific examples of the aryl group may include phenyl, naphthyl, anthracenyl, pyridyl, dimethyla-nilinyl, anisoryl, etc. The alkylaryl group refers to an aryl group having the alkyl group as a substituent.

Among the substituents of the Chemical Formulas 1 and 2, the arylalkyl group is an alkyl group having the aryl group as a substituent; the halogen group is a fluorine group, a chlorine group, a bromine group, or an iodine group; the alkylamino group is an amino group having the alkyl group as a substituent, where the specific examples of the amino group include a dimethylamino group, diethylamino group, etc.; and the arylamino group is an amino group having the aryl group as a substituent, where the specific examples of the arylamino group include a diphenylamino group, etc. However, the specific examples of each group are not limited to those mentioned above.

In the preparation method for the block copolymer, the transition metal compound derived from a compound of the Chemical Formula 1 as a ligand contained in the catalyst composition prefers involving polymerization and coupling of the ethylene or propylene monomer to form a hard segment, while the compound of the Chemical Formula 2 primarily involves polymerization and coupling of the α-olefin monomer to form a soft segment. Therefore, the use of the catalyst composition leads to interactions of those two catalysts in alternately forming the hard segment having a lower content of the α-olefin repeating unit and the soft segment having a higher content of the α-olefin repeating unit, thereby providing an olefin bock copolymer with a higher degree of blocking than the conventional copolymers. Such an olefin block copolymer particularly satisfies the above-described relationship as given by the Mathematical Formula 1, consequently with excellences in elasticity and heat resistance and enhanced processability relative to the conventional block copolymers. Thus, the block copolymer can be properly used as an olefin-based elastomer in a wider range of applications.

Furthermore, the use of the catalyst composition provides a block copolymer with excellent heat resistance at high productivity through a relatively simple process of preparation, greatly contributing to the commercialization of olefin-based elastomers with good heat resistance.

On the other hand, the compound of the Chemical Formula 1 can be a compound represented by the following Chemical Formula 1-1 or 1-2:

[Chemical Formula 1-1]

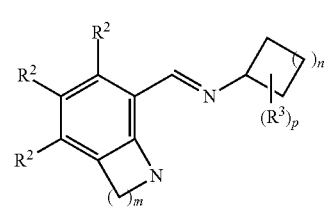

[Chemical Formula 1-2]

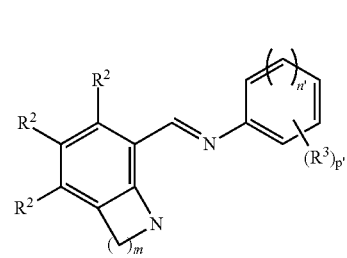

In the Chemical Formula 1-1 or 1-2, m and $R^2$ are as defined in the Chemical Formula 1; n is an integer from 1 to 7; n' is an integer from 1 to 5; p is an integer from 0 to 2+n; p' is an integer from 0 to 5+n'; and $R^3$s are the same or different from one another and independently selected from deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, or $C_4$-$C_{20}$ heterocyclic, where at least two $R^3$s are linked to each other to form an aliphatic or aromatic ring. For a more specific example, $R^3$ is $C_1$-$C_{20}$ alkyl, $C_6$-$C_{20}$ cycloalkyl, $C_2$-$C_{20}$ alkenyl, or $C_6$-$C_{20}$ aryl, where at least two $R^3$s are linked to each other to form an aliphatic or aromatic ring.

In the Chemical Formula 1-1 or 1-2, for another specific example, m is 2 or 3; n is 2 or 3; and n' is from 1 to 3.

Specific examples of the compound of the Chemical Formula 1 may include at least one selected from the group consisting of the compounds represented by the following Chemical Formula 1-3:

[Chemical Formula 1-3]

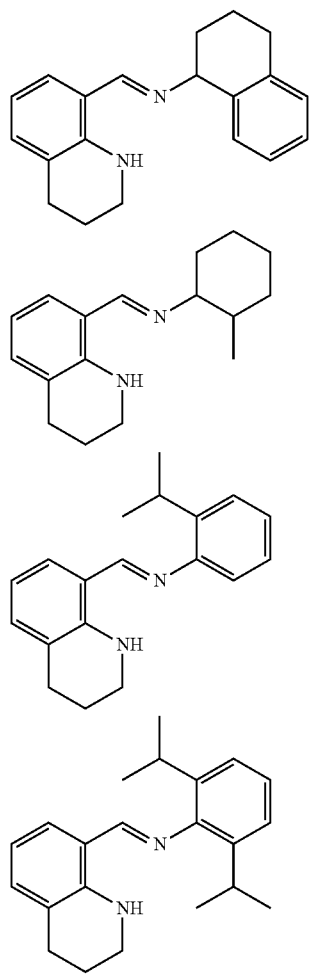

The general preparation method for the compound of the Chemical Formula 1 is given as follows:

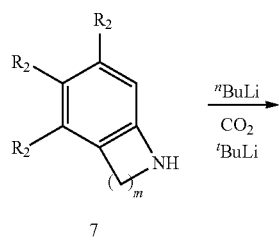

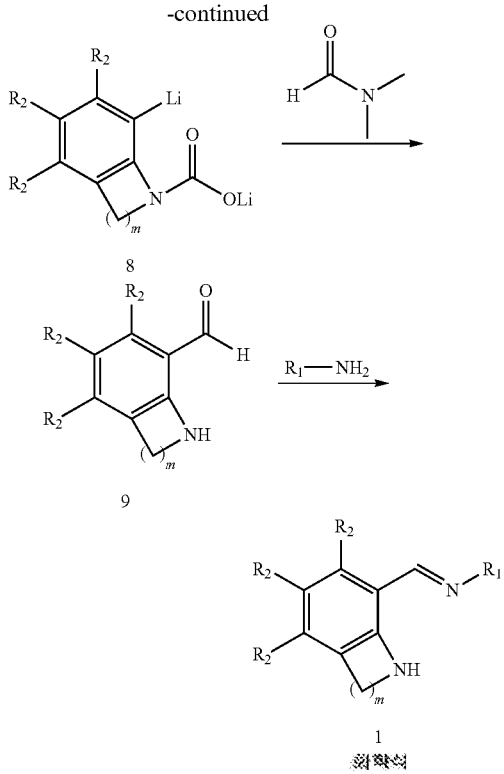

In the preparation method for the compound of the Chemical Formula 1, $R^1$ and $R^2$ are as defined in the Chemical Formula 1. In the preparation method, compound 7 can be used as a starting material to synthesize intermediate 8 by selective lithium substitution, and then DMF (N,N-dimethyl formamide) is added to obtain compound 9. Subsequently, the compound 9 is reacted with $R^1$—$NH_2$ through reflux or agitation to yield a compound of the Chemical Formula 1. Particularly, when $R^1$ in $R^1$—$NH_2$ is aryl, reflux is carried out overnight after an addition of 4A MS to yield the final product; or when $R^1$ is alkyl or alkylaryl, agitation is carried out overnight at the room temperature.

Depending on the type of $R^1$, the compound of the Chemical Formula 1 can be a ligand compound (e.g., NN chelate) having two chelating points with a metal or a ligand compound (e.g., NNN, NNO, or NNC chelate) having at least three chelating points with a metal.

The preparation method for the olefin block copolymer uses, as a catalyst, a transition metal compound having the compound of the Chemical Formula 1 as a ligand forming a coordination bond to a Group IV transition metal, the specific examples of which may include Ti, Zr, or Hf.

The transition metal compound can be represented by, if not specifically limited to, any one of the following structural formulas:

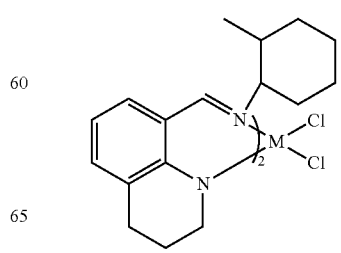

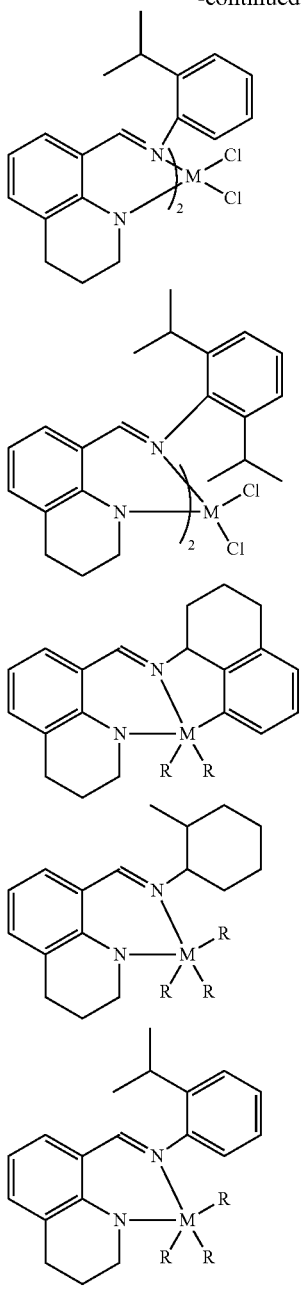

In the structural formulas, M is a Group IV transition metal; and Rs are the same or different from one another and independently selected from the group consisting of hydrogen, deuterium, halogen, nitrile, acetylene, amine, amide, ester, ketone, $C_1$-$C_{20}$ alkyl, $C_2$-$C_{20}$ alkenyl, $C_6$-$C_{20}$ aryl, $C_4$-$C_{20}$ heterocyclic, $C_1$-$C_{20}$ alkoxy, and $C_6$-$C_{20}$ aryloxy.

As can be seen from the structural formulas, the transition metal compound may have a structure that the mole ratio of the ligand to the transition metal is 2:1 or 1:1. Such a structural characteristic contributes to a relatively high content of the transition metal in the transition metal compound.

According to one example of the present invention, the transition metal compound may be prepared by the method given as follows. Firstly, a defined amount of a ligand represented by the Chemical Formula 1 and 1.05 equivalent of a metal precursor are mixed together, and an appropriate amount of a toluene solvent is added to the mixture at about −75 to −80° C. The resultant mixture is then slowly heated up to the room temperature and stirred for 6 to 24 hours. Subsequently, the solvent is removed to yield a desired transition metal compound; or if the added amount of the solvent is known, the desired transition metal compound is obtained in the solution phase.

The preparation method for the olefin block copolymer may use a compound of the Chemical Formula 2 as a catalyst, in addition to the transition metal compound derived from the Chemical Formula 1. Such a compound of the Chemical Formula 2 can be obtained by a known method as disclosed in, for example, Korean Patent Publication No. 0820542.

The compound of the Chemical Formula 2 can be a compound represented by the following Chemical Formula 2-1 in consideration of the electronic and stereoscopic environments around the metal in the Chemical Formula 1:

[Chemical Formula 2-1]

In the Chemical Formula 2-1, $R^4$ and $R^5$ are independently hydrogen, $C_1$-$C_{20}$ alkyl, $C_6$-$C_{20}$ aryl, or silyl; each $R^6$s are independently $C_1$-$C_{20}$ alkyl, $C_6$-$C_{20}$ aryl, $C_2$-$C_{20}$ alkenyl, $C_7$-$C_{20}$ alkylaryl, $C_7$-$C_{20}$ arylalkyl, $C_1$-$C_{20}$ alkoxy, $C_6$-$C_{20}$ aryloxy, or amido, where at least two $R^6$s are linked to each other to form an aliphatic or aromatic ring; $Q^3$ and $Q^4$ are independently halogen, $C_1$-$C_{20}$ alkyl, $C_6$-$C_{20}$ arylamido, $C_2$-$C_{20}$ alkenyl, or $C_6$-$C_{20}$ aryl, and M is a Group IV transition metal.

The compound of the Chemical Formula 2 or 2-1 has the amido group linked to the amino or alkoxy group via a phenylene bridge to form a narrow angle of Cp-M-E and a wide angle of $Q^1$-M-$Q^2$ or $Q^3$-M-$Q^4$ to which monomers are accessible. This allows bulky monomers to gain easy access to the compound. Such a structural characteristic makes the compound of the Chemical Formula 2 or 2-1 prefer involving polymerization and coupling of α-olefin rather than ethylene or propylene and contribute to formation of a soft segment. Contrarily, the transition metal compound derived from the ligand of the Chemical Formula 1 contributes to formation of a hard segment.

Unlike the silicone-bridged CGC structure, the compound of the Chemical Formula 2 or 2-1 may form a stable and rigid six-membered ring structure having a metal linked to a nitrogen via, for example, a phenylene bridge. Such a compound is activated through reaction with a cocatalyst such as methyl aluminoxane or $B(C_6F_5)_3$ and then applied to a polymerization of olefin, thereby producing an olefin block copolymer characterized by high activity, high molecular weight, and high copolymerizability even at high polymerization temperature.

The catalyst composition may further comprise at least one cocatalyst compound selected from the group consisting of the compounds represented by the following Chemical Formula 3, 4 or 5, in addition to the two cocatalysts (transition metal compounds):

$$J(R^{4'})_3 \quad \text{[Chemical Formula 3]}$$

In the Chemical Formula 3, J is aluminum (Al) or boron (B); and $R^4$ s are independently a halogen or a halogen-substituted or unsubstituted $C_1$-$C_{20}$ hydrocarbyl radical.

$$[L-H]^+[ZA_4]^- \text{ or } [L]^+[ZA_4]^- \quad \text{[Chemical Formula 4]}$$

In the Chemical Formula 4, L is a neutral or cationic Lewis acid; H is hydrogen; Z is a Group 13 element, and As are independently $C_6$-$C_{20}$ aryl or $C_1$-$C_{20}$ alkyl in which at least one hydrogen is substituted by a halogen, a $C_1$-$C_{20}$ hydrocarbyl group, a $C_1$-$C_{20}$ alkoxy group, or a phenoxy group.

$$-[Al(R^{5'})-O]_a- \quad \text{[Chemical Formula 5]}$$

In the Chemical Formula 5, $R^{5'}$ is a halogen or a halogen-substituted or unsubstituted $C_1$-$C_{20}$ hydrocarbyl radical; and a is an integer of 2 or greater.

In this regard, the compound of the Chemical Formula 3 may be an alkyl metal compound without any limitation, the specific examples of which may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and so forth.

The specific examples of the compound of the Chemical Formula 4 may include triethylammonium tetra(phenyl) boron, tributylammonium tetra(phenyl) boron, trimethylammonium tetra(phenyl) boron, tripropylammonium tetra(phenyl) boron, trimethylammonium tetra(p-tolyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetra(pentafluorophenyl) boron, N,N-diethylanilinium tetra(phenyl) boron, N,N-diethylanilinium tetra(pentafluorophenyl) boron, diethylammonium tetra(pentafluorophenyl) boron, trimethylphosphonium tetra(phenyl) boron, triethylammonium tetra(phenyl) aluminum, tributylammonium tetra(phenyl) aluminum, trimethylammonium tetra(phenyl) aluminum, tripropylammonium tetra(phenyl) aluminum, trimethylammonium tetra(p-tolyl) aluminum, tripropylammonium tetra(p-tolyl) aluminum, triethylammonium tetra(o,p-dimethylphenyl) aluminum, tributylammonium tetra(p-trifluoromethylphenyl) aluminum, trimethylammonium tetra(p-trifluoromethylphenyl) aluminum, tributylammonium tetra(pentafluorophenyl) aluminum, N,N-diethylanilinium tetra(phenyl) aluminum, N,N-diethylanilinium tetra(pentafluorophenyl) aluminum, diethylammonium tetra(pentafluorophenyl) aluminum, triphenylphosphonium tetra(phenyl) aluminum, trimethylphosphonium tetra(phenyl) aluminum, tripropylammonium tetra(p-tolyl) boron, triethylammonium tetra(o,p-dimethylphenyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetra (pentafluorophenyl) boron, N,N-diethylanilinium tetra (phenyl) boron, triphenylphosphonium tetra(phenyl) boron, triphenylcarbonium tetra(p-trifluoromethylphenyl) boron, triphenylcarbonium tetra(pentafluorophenyl) boron, trityl tetra(pentafluorophenyl) boron, dimethylanilinium tetrakis (pentafluorophenyl) borate, trityltetrakis(pentafluorophenyl) borate, and so forth.

The compound of the Chemical Formula 5 may be an alkylaluminoxane without any limitation, the specific examples of which may include methylaluminoxane, ethylaluminoxane, isobutylaluminoxane, butylaluminoxane, and so forth.

The added amount of the cocatalyst compound may be given so that the mole ratio of the cocatalyst with respect to the transition metal compound derived from the Chemical Formula 1 or the compound represented by the Chemical Formula 2 (hereinafter, referred to as "main catalyst compound") is about 1:1 to 1:20, such as, for example, about 1:1 to 1:18, or about 1:1 to 1:15. To acquire the effect of the cocatalyst compound to a defined level or above, the cocatalyst may be added so that the mole ratio of the cocatalyst compound with respect to the main catalyst compound is 1:1 or greater. Further, the cocatalyst compound may be used so that the mole ratio of the cocatalyst compound with respect to the main catalyst compound is 1:20 or less, in order to properly control the properties of the block copolymer product and effectively activate the main catalyst compound.

The catalyst compound may further comprise a polymerization aid. The polymerization aid may be at least one compound selected from the group consisting of an aluminum compound containing a $C_1$-$C_{12}$ hydrocarbyl substituent, a zinc compound containing a $C_1$-$C_{12}$ hydrocarbyl substituent, and a gallium compound containing a $C_1$-$C_{12}$ hydrocarbyl substituent. Specific examples of the polymerization aid may include triethylaluminum or diethylzinc.

The polymerization aid plays a role to enhance the degree of blocking and the crystallinity of the molecular structure and increase the content of the α-olefin repeating unit to produce a block copolymer with low density and high melting temperature. This is because the polymerization aid enables alternating actions of the transition metal compound derived from the Chemical Formula 1 and the compound of the Chemical Formula 2 and helps alternately forming a plurality of segments constituting the olefin block copolymer, that is, for example, hard and soft segments. In other words, such an action of the polymerization aid makes it possible to produce an olefin block copolymer with a higher degree of blocking and hence higher melting temperature and higher heat resistance.

The added amount of the polymerization aid may be given to have the mole ratio of the polymerization aid with respect to the main catalyst compound in the range of about 1:10 to 1:1,000, such as, for example, about 1:10 to 1:500, or about 1:20 to 1:200.

In other words, the content of the polymerization aid may be given to have the mole ratio of the polymerization aid with respect to the main catalyst compound in the range of 1:10 or greater in view of providing the effect of the polymerization aid to a defined level or above; and 1:1,000 or less in consideration of properly controlling the properties of the block copolymer product and providing high activity of the main catalyst compound.

According to the above-described preparation method of the another embodiment, the olefin block copolymer can be prepared by a method that includes the step of copolymerizing monomers comprising ethylene or propylene and α-olefin in the presence of the aforementioned catalyst composition. In this regard, specific examples of the α-olefin monomer may include 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

The copolymerization step may be carried out at a temperature of about 140° C. or higher, about 140 to 180° C., or about 140 to 160° C., and under the pressure of about 50 bar or higher, about 50 to 120 bar, or about 70 to 100 bar. The conventional metallocene or post-metallocene catalysts are known to have an abrupt drop in their activity at high temperature. Contrarily, the main catalyst compounds contained in the aforementioned catalyst composition can maintain good activity even under conditions including a temperature of about 140° C. or higher and a pressure of about 50 bar or higher. Accordingly, the copolymerization process can be carried out under such high-temperature and high-pressure conditions to acquire a block copolymer with high molecular weight and good properties with more efficiency.

The copolymerization step may be carried out as a solution phase process using the aforementioned catalyst composition, or as a slurry or gas phase process using the catalyst composition in combination with an inorganic support such as silica. Hereinafter, a description will be given as to the more specific conditions and method for the process of the copolymerization step focusing on the continuous solution polymerization method.

In the copolymerization step, a scavenger may be added into the reactor as much as 0.4 to 5 times the total content of water. Such a scavenger which serves to eliminate impurities such as water or air potentially contained in the reactants can be added prior to the copolymerization of the reactants. The mixture of the scavenger and the reactants are added into a separate reactor other than the polymerization reactor, or into a reactant-feeding line of the polymerization reactor for a sufficient period of time. Preferred examples of the scavenger may include, but are not specifically limited to, trialkylaluminum, such as TiBAl (triisobutylaluminum) or TOA (trioctylaluminum).

The polymerization step may be carried out by adding the aforementioned catalyst composition, monomers, the polymerization aid, and the scavenger into the reactor.

In this regard, the catalyst composition may be dissolved or diluted with a solvent suitable for olefin polymerization, including aliphatic hydrocarbon solvents having 5 to 12 carbon atoms (e.g., pentane, hexane, heptane, nonane, decane, or their isomers); aromatic hydrocarbon solvents (e.g., toluene or benzene); or chlorine-substituted hydrocarbon solvents (e.g., dichloromethane or chlorobenzene).

In one example performing the copolymerization step, the mole ratio of ethylene or propylene to the solvent needs to be suitable for dissolving the block copolymer product. For example, the mole ratio of ethylene or propylene to the solvent can be about 1/10,000 to 10, about 1/100 to 5, or about 1/20 to 1.

Such a proper control of the mole ratio makes it possible to effectively perform the copolymerization step and optimize the amount of the solvent, thus preventing a rise of the facility or energy expenses for purification and recycling of the solvent.

The solvent may be added into a reactor at about −40 to 150° C. using a heater or a freezer to initiate the polymerization reaction together with the monomers and the catalyst composition.

Further, a high-capacity pump is used to raise the pressure up to about 50 bar in supplying reactants (e.g., the solvent, the monomers, and the catalyst composition), so the mixture of the reactants can be passed without additional pumping between the reactor arrangement and pressure-reducing apparatus and the separator.

The concentration of the block copolymer produced in the reactor can be maintained to a concentration level of less than about 20 wt. % in the solvent. After an elapse of a short retention time, the block copolymer product can be transferred to a first solvent separation process in order to remove the solvent. The appropriate retention time of the block copolymer in the reactor may be about 1 minute to 10 hours, about 3 minutes to one hour, or about 5 to 30 minutes. Such a retention time prevents a drop of productivity or a loss of the catalyst and optimizes the size of the reactor.

Subsequent to the aforementioned copolymerization step, the solvent separation process is further carried out by changing the temperature and pressure of the block copolymer solution in order to remove the solvent remaining with the block copolymer released from the reactor. In this regard, a heater is used to maintain the melting state of the block copolymer solution transferred from the reactor. The unreacted solvent is evaporated in the separator, and the block copolymer product is granulated through an extruder.

As described above, the present invention provides an olefin block copolymer with excellent heat resistance and elasticity and a preparation method for the olefin block copolymer. Particularly, such an olefin block copolymer can be prepared by a simple process.

Accordingly, the olefin block copolymer contributes to commercialization of olefin-based elastomers excellent in heat resistance and other general properties and can be properly adopted in a variety of applications where it is available as a substitute for rubber materials.

EXAMPLES

Hereinafter, some examples will be given for better understanding of the present invention, but the following examples are presented only for a mere illustration though, and the scope of the present invention should not be construed to be defined thereby.

In the following examples, organic reagents and solvents as used herein are purchased from Aldrich Chemical Company Inc. and Merck Chemicals Co., Ltd. and purified according to the standard methods. In all the steps of synthesis, a contact with air and water was avoided to enhance the reproducibility of the experiments. To identify the structure of a chemical, 400 MHz nuclear magnetic resonance (NMR) and X-ray spectroscopic instruments were used to obtain the respective spectra and diagrams.

The term "overnight" as used herein refers to approximately 12 to 16 hours, and the term "room temperature" as used herein refers to the temperature of 20 to 25° C. The synthesis of all the transition metal compounds and the preparation of experiments were carried out using the dry box technique or glass tools maintained in dry condition under the dry nitrogen atmosphere. All the solvents used in the examples were of the HPLC level and dried before use.

Preparation Example 1

Preparation of (E)-N-((1,2,3,4-tetrahydroquinolin-8-yl)methylene)-2-methylcyclohexanamine 1.06 g of tetrahydroquinolino aldehyde was dissolved in 17 mL of methanol, and 1.3 mL of 2-methylcyclohexyl amine was slowly added. After agitated overnight at the room temperature, the resultant solution was removed of the solvent under reduced pressure and then dissolved in hexane again to prepare a thick solution, which was stored in a freezer. This solution contained two stereoscopic isomer products at a ratio of about 1.5:1. After about 2 days, a white crystalline solid appeared in the solution. The same procedures were performed on the remaining store solution to collect a solid, which was washed with cold methanol and hexane and dried to yield pure stereoscopic isomer products (yield: 50%).

1H NMR (500 MHz, d-toluene): 0.83 (d, J=7 Hz, 3H, CH$_3$), 0.95-1.01 (m, 1H, CH), 1.20-1.29 (m, 2H, CH$_2$), 1.52-1.71 (m, 8H, CH$_2$), 2.09-2.10 (m, d-tol), 2.38-2.43 (m, 1H, CH), 2.51-2.53 (m, 2H, CH$_2$), 3.12-3.13 (m, 2H, CH$_2$), 6.55 (t, J=7.5 Hz, 1H, phenyl), 6.83 (d, J=7.5 Hz, 1H, phenyl), 6.97-7.01 (m, 1H, phenyl, d-tol), 7.10 (s, d-tol), 8.16 (s, 1H, CH), 9.27 (b, 1H, NH).

Preparation Example 2

Preparation of Zirconium Catalyst I 145 mg of the ligand compound prepared in the Preparation Example 1 and 231 mg of zirconium benzyl were subjected to sampling in a globe box and then put into a Schlenk flask. The Schlenk flask was taken out and cooled down to −78° C. With the temperature maintained, 12 mL of toluene was slowly added to the resultant solution, which was then gradually heated up to the room temperature and agitated for 6 hours to obtain a thick orange-colored toluene solution. The solution was removed of the solvent to yield a pure product.

1H NMR (500 MHz, d-toluene): 1.09-1.13 (m, 1H, CH$_3$), 1.50-1.61 (m, 1H, CH$_2$), 1.65-1.75 (m, 4H, CH$_2$), 2.31 (d, J=10.5 Hz, 1H, CH$_2$Ph), 2.49-2.61 (m, 6H, CH$_2$ and CH$_2$Ph), 2.67 (d, J=10.5 Hz, 1H, CH$_2$Ph), 3.18-3.24 (m, 1H, CH$_2$), 3.56-3.62 (m, 1H, CH$_2$), 4.30-4.34 (m, 1H, CH), 6.55-7.23 (m, 15H, phenyl), 7.97 (s, 1H, 이민 CH), 8.13 (d, J=7 Hz, 1H, phenyl).

Preparation Example 3

Preparation of Zirconium Catalyst II 90 mg of the ligand compound prepared in the Preparation Example 1 and 169 mg of zirconium benzyl were subjected to sampling in a globe box and then put into a Schlenk flask. The Schlenk flask was taken out and cooled down to −78° C. With the temperature maintained, 10 mL of toluene was slowly added to the resultant solution, which was then gradually heated up to the room temperature and agitated for 2 days to obtain a thick orange-colored toluene solution as a product solution.

1H NMR (500 MHz, d-toluene): 0.41 (d, J=7 Hz, 3H, CH$_3$), 0.83-1.03 (m, 4H, CH$_2$), 1.18-1.31 (m, 2H, CH$_2$), 1.40-1.62 (m, 5H, CH$_2$), 1.83-1.88 (m, 1H, CH), 2.05-2.12 (m, d-tol, CH$_2$), 2.47-2.55 (m, 8H, CH$_2$), 3.21-3.25 (m, 1H, CH), 3.38-3.41 (m, 1H, CH), 3.79-3.83 (m, 1H, CH), 6.58 (t, J=7.5 Hz, 1H, phenyl), 6.82-7.12 (m, phenyl, d-tol), 8.07 (s, 1H, CH).

Comparative Examples 1, 2 and 3 and Examples 1 to 7

Preparation of Ethylene/1-Octene Block Copolymer

Under the pressure of 89 bar, 1-octene and ethylene as monomers and a hexane solvent (3.20 kg/h) were fed into a 1.5 Lg continuous stirred tank reactor preheated up to 100 to 150° C. Into the reactor were fed defined catalysts as given in the following Table 1 and a dimethylanilinium tetrakis(pentafluorophenyl) borate cocatalyst from a catalyst storage tank and then added a scavenger (TIBAL) and diethyl zinc to activate a copolymerization reaction. The scavenger was first mixed with reactants in order to eliminate impurities potentially contained in the reactants and then fed into the reactor. In the Examples, the polymerization reaction was carried out at a relatively high temperature of 140 to 150° C., and the polymer solution resulting from the copolymerization reaction was transferred into a solvent separator to remove most of the solvent. The resultant solution was passed through a cooling water and a cutter to yield a granulated polymer product. The polymerization conditions for ethylene and 1-octene according to the Comparative Examples 1, 2 and 3 and Examples 1 to 7 are presented in the following Table 1.

[Catalyst A]

The catalyst A compound as used in the following Examples and Comparative Examples was (E)-N-((1,2,3,4-tetrahydroquinolin-8-yl)methylene)-2-methylcyclohexanamine zirconium benzyl as prepared in the Preparation Example 2.

[Catalyst B]

The catalyst B compound as used in the following Examples and Comparative Examples was 1,2,3,4-tetrahydro-8-(2,3,4-trimethyl-5-methylenecyclopenta-1,3-dienyl)quinolone dimethyl titanium as prepared in the example of Korean Patent Publication No. 0820542.

TABLE 1

|  | Comparative Example | | |
| --- | --- | --- | --- |
|  | 1 | 2 | 3 |
| Polymerization temperature (° C.) | 168 | 165 | 162 |
| Catalyst A (μmol/hr) | — | — | — |
| Catalyst B (μmol/hr) | 18 | 18 | 18 |
| Ethylene (kg/hr) | 0.63 | 0.63 | 0.63 |
| 1-octene (kg/hr) | 0.60 | 0.45 | 0.30 |
| Cocatalyst (μmol/hr) | 90 | 90 | 90 |
| Scavenger (ml/hr) (10 mM) | 3.5 | 3.5 | 3.5 |
| Diethyl zinc (ml/hr) (10 mM) | — | — | — |
| Hydrogen (L/hr) | — | — | — |

|  | Example | | | | | | |
| --- | --- | --- | --- | --- | --- | --- | --- |
|  | 1 | 2 | 3 | 4 | 5 | 6 | 7 |
| Polymerization temperature (° C.) | 143 | 144 | 141 | 143 | 142 | 142 | 149 |
| Catalyst A (μmol/hr) | 18 | 18 | 18 | 18 | 18 | 18 | 18 |

TABLE 1-continued

| Catalyst B (μmol/hr) | 6 | 6 | 6 | 6 | 6 | 6 | 6 |
|---|---|---|---|---|---|---|---|
| Ethylene (kg/hr) | 0.63 | 0.68 | 0.63 | 0.63 | 0.63 | 0.58 | 0.68 |
| 1-octene (kg/hr) | 0.90 | 0.90 | 0.75 | 0.67 | 0.60 | 0.60 | 0.60 |
| Cocatalyst (μmol/hr) | 120 | 120 | 120 | 120 | 120 | 120 | 120 |
| Scavenger (ml/hr) (10 mM) | 3.5 | 3.5 | 3.5 | 3.5 | 3.5 | 3.5 | 3.5 |
| Diethyl zinc (ml/hr) (10 mM) | 3.5 | 3.5 | 3.5 | 3.5 | 3.5 | 3.5 | 3.5 |
| Hydrogen (L/hr) | — | — | — | — | 1.5 | — | — |

Experimental Example 1

The copolymers prepared in the Examples and Comparative Examples were evaluated in regards to properties according to the methods as described below. The evaluation results are presented in Tables 2 and 3.

1) Analysis on the Content of the Hard Segment

The content of the hard segment in Examples and Comparative Examples was calculated using the time domain NMR instrument (TD NMR; Minspec™ manufactured by Optics) commercially available. Firstly, the TD NMR instrument was adopted to measure the FDI (Free Induction Decay) for the samples of the Examples and the Comparative Examples. The measurement results were as depicted, for example, in FIG. 3. FID is the function of time and intensity. The four constants, such as A, B, $T2_{fast}$, and $T2_{slow}$, in the following Formulas 3 were varied to elicit a functional formula most approximating the FID functional graph, thereby determining A, B, $T2_{fast}$, and $T2_{slow}$ values of each sample.

It is known that the T2 (spin-spin relaxation time) relaxation for the hard segment as calculated from the functional formula appears fast, while the T2 relaxation for the soft segment is slow. Hence, among the calculated values of A, B, $T2_{fast}$, and $T2_{slow}$, the lower T2 value was determined as the T2 value of the hard segment, that is, $T2_{fast}$, while the higher T2 value was determined as the T2 value of the soft segment, that is, $T2_{slow}$. Through this procedure, the content (wt. %) of the hard segment as well as the constants of A and B was calculated.

$$\text{Intensity} = A \times \text{EXP}(-\text{Time}/T2_{fast}) + B \times \text{EXP}(-\text{Time}/T2_{slow})$$ [Mathematical Formulas 3]

Determine A, B, $T2_{fast}$, and $T2_{slow}$ by fitting.

$$\text{Hard segment(wt. \%)} = A/(A+B) \times 100$$

In the Mathematical Formulas 3, intensity and time are values calculated through the FID analysis; $T2_{fast}$ is the T2 (spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

2) Analysis on the Content of the Ethylene Repeating Unit

The copolymers of Examples and Comparative Examples were analyzed in regards to the content of the ethylene repeating unit by using $^{13}$C-NMR spectroscopy.

3) MI (Melt Index)

The copolymers of the Examples and Comparative Examples were measured in regards to melt index (MI) according to the ASTM D-1238 (conditions E, 190° C., load of 2.16 kg).

4) Density

Each copolymer of the Examples and Comparative Examples was molded into a sample in the form of a sheet (3 mm thick and 2 cm in radius) using a press mold (180° C.) and measured in regards to the density with a Mettler scale at a rate of 10° C./min.

5) Melting Temperature (Tm)

The copolymer sample was heated up to 200° C., maintained at the temperature for 5 minutes, cooled down to 30° C., and then heated up again. In the measurement results from DSC (Differential Scanning calorimeter, manufacture by TA Instruments), the top of the heat flow curve was determined as the melting temperature. In this regard, the heating/cooling rate was 10° C./min, and the measurement results obtained in the second heating interval were used to determine the melting temperature.

6) Crystallization Temperature (Tc)

A heat flow curve was obtained by decreasing the temperature using a DSC (Differential Scanning calorimeter, manufactured by TA Instruments) under the same conditions for determination of the melting temperature. The top of the heat flow curve was determined as the crystallization temperature.

7) PDI (PolyDispersity Index): Weight Average Molecular Weight and Molecular Weight Distribution GPC (Gel Permeation Chromatography) was adopted to measure the number average molecular weight (Mn) and the weight average molecular weight (Mw), and the weight average molecular weight was divided by the number average molecular weight to calculate the molecular weight distribution.

8) TMA (Thermal Mechanical Analysis)

A sample penetration testing (under the force of 0.5 N) was carried out using TMA Q400 manufactured by TA Instruments, where the temperature was raised from 25° C. at a rate of 5° C./min. The distance of the TMA probe from the sample was measured as a function of temperature, and the temperature when the probe was 1 mm distant from the sample was considered as the test value.

9) Permanent Recovery

A universal testing machine manufactured by Zwick was employed to measure the permanent recovery after 300% elongation for the sample according to the ASTM D638.

10) Hardness Shore A

An Asker hardness tester manufactured by Kobunshi Keiki Co., Ltd. was used to make a sample and measure the Shore hardness of the sample according to the ASTM D2240 standards.

Experimental Example 2

The density X and the TMA value Y of each copolymer prepared in the Examples and the Comparative Examples was depicted in FIG. 1. The data are subjected to linear regression analysis to elicit FIG. 1. Referring to FIG. 1, the block copolymers of the Examples 1 to 7 and the random copolymers of the Comparative Examples 1, 2 and 3 satisfied the equations given by: Y=1378.8X−1095.7 ($R^2$=0.8402) and Y=1103.9X−888.36 ($R^2$=0.9975), respectively.

This shows that the block copolymers of the Examples 1 to 7 satisfied the Mathematical Formula 1 as given by Y≥1378.8X−1115 (R²=1), while the random copolymers of the Comparative Examples 1, 2 and 3 hardly satisfied the Mathematical Formula 1.

TABLE 2

|  | Content of hard segment (wt. %) | Content of ethylene (wt. %) | Mw | PDI | Tm (° C.) | Tc (° C.) |
|---|---|---|---|---|---|---|
| Comparative Example 1 | Immeasurable | 65 | 89,000 | 2.5 | 58 | 55 |
| Comparative Example 2 | Immeasurable | 77 | 95,000 | 2.8 | 72 | 56 |
| Comparative Example 3 | Immeasurable | 86 | 97,000 | 2.6 | 82 | 54 |
| Example 1 | 34 | 63 | 103,200 | 2.5 | 123 | 101 |
| Example 2 | 35 | 66 | 109,400 | 2.5 | 124 | 101 |
| Example 3 | 36 | 68 | 118,500 | 2.4 | 123 | 101 |
| Example 4 | 39 | 69 | 114,300 | 2.5 | 124 | 101 |
| Example 5 | 35 | 69 | 81,500 | 2.9 | 123 | 103 |
| Example 6 | 46 | 73 | 121,400 | 2.5 | 124 | 101 |
| Example 7 | 48 | 73 | 123,200 | 2.5 | 124 | 101 |

* For the ethylene-1-octene copolymers of Comparative Examples 1, 2 and 3, a plurality of blocks or segments distinguishable by properties were impossible to define, so the hard segment content for the copolymers of Comparative Examples 1 and 2 was immeasurable or technically pointless.

TABLE 3

|  | Density (g/cm³) | MI (g/10 min) | TMA (° C.) | Permanent recovery (%) | Hardness Shore A |
|---|---|---|---|---|---|
| Comparative Example 1 | 0.870 | 3.6 | 72 | 160 | 59 |
| Comparative Example 2 | 0.886 | 3.8 | 88 | 140 | 85 |
| Comparative Example 3 | 0.900 | 2.8 | 104 | Immeasurable | 92 |
| Example 1 | 0.869 | 1.8 | 98 | 20 | 66 |
| Example 2 | 0.871 | 1.0 | 104 | 20 | 72 |
| Example 3 | 0.873 | 0.7 | 111 | 35 | 75 |
| Example 4 | 0.876 | 0.7 | 114 | 35 | 80 |
| Example 5 | 0.877 | 3.6 | 114 | 50 | 80 |
| Example 6 | 0.880 | 0.6 | 116 | 45 | 81 |
| Example 7 | 0.881 | 0.4 | 119 | 40 | 84 |

*The copolymer of Comparative Example 3 hardly had elongation and showed almost no elasticity, so the permanent recovery was not measurable.

As can be seen from Tables 2 and 3, the block copolymers of the Examples satisfying the Mathematical Formula 1 had a characteristic of a blocked form including hard and soft segments. Further, such block copolymers of the Examples showed excellent elasticity pertaining to a lower value of permanent recovery in comparison with the random copolymers in the similar density range. Furthermore, the block copolymers of the Examples had good heat resistance as demonstrated by high TMA value and high melting temperature in contrast to the random copolymers of the Comparative Examples 1, 2 and 3 in the similar density range.

What is claimed is:

1. An olefin block copolymer comprising a plurality of blocks or segments, each comprising an ethylene or propylene repeating unit and an α-olefin repeating unit at different weight fractions,
   wherein the olefin block copolymer has a density of 0.85 to 0.92 g/cm³, and density X (g/cm³) and TMA (Thermal Mechanical Analysis) value Y (° C.) satisfy the following Mathematical Formula 1:

$Y \geq 1378.8X - 1115$,  [Mathematical Formula 1]

wherein the olefin block copolymer has a melt index of 0.7 to 4.0 g/10min under a load of 2.16 kg at 190 ° C. and a Shore hardness of 60 to 90, and
   wherein the olefin block copolymer has a permanent recovery (after 300% elongation) of 20% to 60%.

2. The olefin block copolymer as claimed in claim 1, wherein the density X (g/cm³) and the TMA (Thermal Mechanical Analysis) value Y (° C.) satisfy the following Mathematical Formula 1a:

$1378.8X - 1076.3 \geq Y \geq 1378.8X - 1115$  [Mathematical Formula 1a]

3. The olefin block copolymer as claimed in claim 1, wherein the TMA value is 70 to 140° C.

4. The olefin block copolymer as claimed in claim 1, wherein the olefin block copolymer comprises a hard segment comprising a first weight fraction of the α-olefin repeating unit and a soft segment comprising a second weight fraction of the α-olefin repeating unit,
   wherein the second weight fraction is greater than the first weight fraction.

5. The olefin block copolymer as claimed in claim 4, wherein the weight fraction of the α-olefin repeating unit contained in the entire block copolymer has a value between the first and second weight fractions.

6. The olefin block copolymer as claimed in claim 4, wherein the olefin block copolymer comprises 10 to 90 wt.% of the hard segment and a remaining content of the soft segment.

7. The olefin block copolymer as claimed in claim 4, wherein the hard segment has a higher value than the soft segment in at least one property of the degree of crystallization, density, and melting temperature.

8. The olefin block copolymer as claimed in claim 1, wherein the olefin block copolymer comprises 30 to 90 wt.% of the ethylene or propylene repeating unit and a remaining content of the a-olefin repeating unit.

9. The olefin block copolymer as claimed in claim 1, wherein the olefin block copolymer has a melting temperature of 100 to 140 ° C.

10. The olefin block copolymer as claimed in claim 1, wherein the olefin block copolymer has a weight average molecular weight of 50,000 to 200,000 and a molecular weight distribution of 2.0 to 4.5.

* * * * *